(12) United States Patent
Tamura et al.

(10) Patent No.: US 6,728,848 B2
(45) Date of Patent: Apr. 27, 2004

(54) METHOD AND SYSTEM FOR BACKING UP STORAGE SYSTEM DATA

(75) Inventors: Keishi Tamura, Odawara (JP);
Yoshinori Okami, Odawara (JP);
Hiroshi Abei, Yokohama (JP); Mikito Ogata, Odawara (JP)

(73) Assignee: Hitachi, Ltd., Tokyo (JP)

( * ) Notice: Subject to any disclaimer, the term of this patent is extended or adjusted under 35 U.S.C. 154(b) by 149 days.

(21) Appl. No.: 09/879,663

(22) Filed: Jun. 11, 2001

(65) Prior Publication Data

US 2002/0199073 A1 Dec. 26, 2002

(51) Int. Cl.[7] .............................................. G06F 12/00
(52) U.S. Cl. ...................... 711/162; 711/161; 707/204
(58) Field of Search ................................ 711/162, 161, 711/114, 154, 156; 345/734, 735, 736; 707/204

(56) References Cited

U.S. PATENT DOCUMENTS

| | | | | |
|---|---|---|---|---|
| 5,544,347 A | | 8/1996 | Yanai et al. ................. 395/489 |
| 5,729,761 A | * | 3/1998 | Murata et al. ................. 710/14 |
| 5,890,204 A | * | 3/1999 | Ofer et al. .................... 711/111 |
| 6,009,466 A | * | 12/1999 | Axberg et al. ............... 709/220 |
| 6,353,878 B1 | * | 3/2002 | Dunham ....................... 711/162 |
| 6,393,483 B1 | * | 5/2002 | Latif et al. .................... 709/226 |
| 6,393,519 B1 | * | 5/2002 | Fujimoto et al. ........... 711/113 |
| 6,421,711 B1 | * | 7/2002 | Blumenau et al. .......... 709/213 |

OTHER PUBLICATIONS

SCSI Primary Commands–2 (SPC–2) Working Draft, pp: 49–86, May 21, 2000.*
Pathlight & Computer Associates, "Pathlight and CA Deliver Server–Free Backup," (Apr. 2000) pp:2–7.*
M. Nicolett; "SAN Exploitation for Backup: Will you go Serverless?"; Sep. 16, 1999; Gartner Group, Inc.*

* cited by examiner

*Primary Examiner*—Donald Sparks
*Assistant Examiner*—Kathy Takeguchi
(74) *Attorney, Agent, or Firm*—Townsend and Townsend and Crew LLP

(57) ABSTRACT

The present invention provides a method, a system and code for backing up information on a storage system, for example, a disk system, connected to a storage area network. The host or server system off loads the task of backing up its data to the storage system that stores the data. In an exemplary embodiment a server sends an E-copy command to a disk system. Next, the disk system finds an available back-up device, for example, a tape or DLT library, and then backs-up the information indicated in the E-copy command to the back-up device. A user interface is provided so that one or more path groups, comprising at least a target port and an initiator port, on a disk system may be designated.

33 Claims, 11 Drawing Sheets

FIG. 3

| BYTE | | |
|---|---|---|
| 0 | OPERATION CODE (83h) | ←410 |
| 1 | RESERVED | |
| 2 | RESERVED | |
| 3 | RESERVED | |
| 4 | RESERVED | |
| 5 | RESERVED | |
| 6 | RESERVED | |
| 7 | RESERVED | |
| 8 | RESERVED | |
| 9 | RESERVED | |
| 10 | PARAMETER LIST LENGTH | ←412 |
| 11 | | |
| 12 | | |
| 13 | | |
| 14 | RESERVED | |
| 15 | CONTROL | |

421
BYTE ↗ 418

| Byte | Field | Ref |
|---|---|---|
| 0 | LIST ID | 420 |
| 1 | STR/NRCR/PRIORITY | 422 |
| 2 | TARGET DESCRIPTOR LIST LENGTH | 424 |
| 8 | SEGMENT DESCRIPTOR LIST LENGTH | 428 |
| 12 | INLINE DATA LENGTH | 429 |
| 16 | E0h | 430 |
| | TARGET DESCRIPTOR 0 | 432 |
| 430 { | ⋮ | |
| | TARGET DESCRIPTOR n | 434 |
| | SEGMENT DESCRIPTOR 0 | 454 |
| 450 { | ⋮ | |
| | SEGMENT DESCRIPTOR m | 454 |
| | INLINE DATA | 455 |

NOTE: CL1 IS DISK CONTROLLER 605A AND CL2 IS CONTROLLER 605B

METHOD AND SYSTEM FOR BACKING UP STORAGE SYSTEM DATA

BACKGROUND OF THE INVENTION

The present invention relates generally to a backup of information stored on a storage system and more particularly to server-free backup of information on a storage area network (SAN).

With the increasing complexity of applications and the use of enormous amounts of information, the traditional model of servers controlling their storage devices has evolved into a Storage Area Network (SAN) model where the back-end storage functions are decoupled from the front end server applications. The servers and storage systems are connected together via high speed fiber-optic networks, i.e., Fibre Channels, and communicate using a Fibre Channel Protocol (FCP). The Fibre Channel paths are determined by high speed Fibre Channel Switches.

One major problem with a SAN was that the servers were still responsible for backup of their data. Thus a server needed to read in its data from a storage device, such as a disk system, and write it to a backup device, such as a tape or DLT library. With the present use of multi-terabyte databases, the backup function seriously reduced performance of the servers.

One prior art method of having a server-free backup was to off load the control of the storage system backup to the Fibre Switches (see the white paper, "Deliver Server-Free Back-up," April 2000, Pathlight Technology, Inc., Ithaca, N.Y.). FIG. 1 shows such a prior art system that uses a Fibre Channel Switch to perform the back-up after receiving a command from the host or server. FIG. 1 shows a server 110 coupled to its storage system, i.e., disk system 114, via a SAN having Fibre Channel Switch 112. A Tape Library 116 which is used for backup is also connected to Fibre Channel Switch 112 via a Fibre channel. The server 110 issues an Extended Copy (E-Copy) command 118 to a Fibre Channel Switch 112. The E-Copy is a SCSI Primary Command 2 or a vendor specific command, such as from Legato ® Systems, Inc. of Mountain View Calif. (referred to herein as Legato ®) that instructs the copying of data from one logical device to another logical device. A copy manager in the Fibre Channel Switch 112 upon receiving the E-copy command from the Server 110 performs the Data transfer 120 by copying data from Disk System 114 to Tape Library 116. The copying proceeds under control of the Fibre Channel Switch 112 without need of server 110 action. Thus the server 112 is free to perform other tasks.

However, the above method of using the Fibre Channel Switches to control the back-ups also has problems. The Fibre Channel Switch 112 sends a read command to the disk system to retrieve back-up data. In addition the server 110 may also send a read command to the Disk System 114 to retrieve data for use in a user application. From the view point of the disk system 114, the disk system may not be able to distinguish between a read from the server 110 and a read for backup from the Fibre Channel Switch 112, thus the Disk System 114 may process both read commands with equal priority. However, the Disk System 114 should process the server read command before the less critical back-up read command.

In addition having the Fibre Channel switch 112 responsible for the heterogeneous disk system backups on a SAN leads to a complicated switch. Also the installed switches must all be compatible and may be required to be from only one vendor. And when the software or hardware on a disk system is modified or upgraded, the backup function of the Fibre Channel switch 112 may need to be changed. Thus using the Fibre channel switch as a back-up controller increases the equipment cost/complexity and maintenance burden.

Thus there is a need for an improved backup technique which further decentralizes the back-up of a storage system on a SAN to, for example, the storage system itself.

SUMMARY OF THE INVENTION

The present invention provides a method, a system and code for backing up information on a storage system, for example, a disk system, connected to a storage area network. The host or server system off loads the task of backing up its data to the storage system that stores the data. In an exemplary embodiment a server sends an E-Copy command to a copy manager on a disk system. Next, the copy manager finds an available back-device, for example a tape or DLT library, and then backups the information indicated in the E-Copy command to the back-up device. A user interface is provided so that one or more path groups, comprising at least a target port and an initiator port, on a disk system may be designated.

In one embodiment of the present invention a method for copying information from a storage system to a backup system of a plurality of backup systems is provided. The storage system is coupled with the plurality of backup systems via a storage area network (SAN). The method includes the storage system receiving a command to copy the information, from the server. Next, the storage system finds an available backup system; and under control of the storage system, the information is copied to the available backup system.

In another embodiment of the present invention a system for server free back up of information on a storage area network is provided. It includes a server system for sending a command to backup the information; a plurality of back-up systems; and a storage system including the information and responsive to the command, finding an available back-up system of the plurality of back-up systems for backing up the information to, where the storage system is coupled with the server system and the plurality of back-up systems.

In yet another embodiment of the present invention a storage system for executing an Extended Copy (E-Copy) command from a server is provided. The storage system is coupled with a plurality of back-up devices over a storage area network, including: a disk for storing data from the server. There is a target port for receiving the E-Copy command, including a parameter list, where the parameter list lists the data for backup to a back-up device port; and there is an initiator port responsive to the E-Copy command for connecting to the back-up device port on the storage area network to backup the data to the backup device.

In a further embodiment of the present invention a RAID system for executing an E-Copy command from a server system, includes: a plurality of disk units for non-volatile storage of data and at least one disk controller system coupled to the plurality of disk units for receiving and executing the E-Copy command from the server. The disk controller system includes: a target port coupled to a first microprocessor, the port receiving the E-Copy command from the server; an initiator port coupled to a second microprocessor, the initiator port for connecting to a target port of a backup device; and a shared memory coupled to the first and second microprocessors for exchanging E-Copy command information; and the disk controller system executes the E-Copy command without need for intervention from the server system.

Another embodiment provides a method for a storage system of backing up the storage system's data according to an extended copy instruction received from a host computer, the method includes; responsive to the extended copy instruction creating a bitmap table stored in memory; concurrently polling the memory by a plurality of concurrently running processors; when a processor of the plurality of concurrently running processors is in the bitmap table, connecting to a backup device in a storage area network; when the connecting is successful backing up the storage system's data to the backup device.

These and other embodiments of the present invention are described in more detail in conjunction with the text below and attached figures.

BRIEF DESCRIPTION OF THE DRAWINGS

FIG. 3 shows an Extended Copy (E-Copy) command of one embodiment of the present invention;

FIG. 4 shows one example of a parameter list of an embodiment of the present invention;

DESCRIPTION OF THE SPECIFIC EMBODIMENTS

A "Storage Area Network" or SAN for the purposes of the embodiments and claims of the present invention means any network, real or virtual, that has one of its primary functions to provide storage from one or more storage systems to one or more computer systems. On example would be a SAN as given in the above background section, which is a storage area network includes Fibre Channels (FC), Fibre network switches and using a Fibre Channel Protocol (FCP). Other examples include a Local Area Network (LAN) with dedicated storage devices using an Asynchronous Transfer Mode (ATM), a Virtual Private Network (VPN) over the Internet with dedicated storage nodes, a LAN using Ethernet connecting a plurality of storage devices or a wireless network connecting a plurality of storage devices. An embodiment of a Fibre Channel SAN is disclosed in detail as one embodiment of the present invention.

Figure 1:
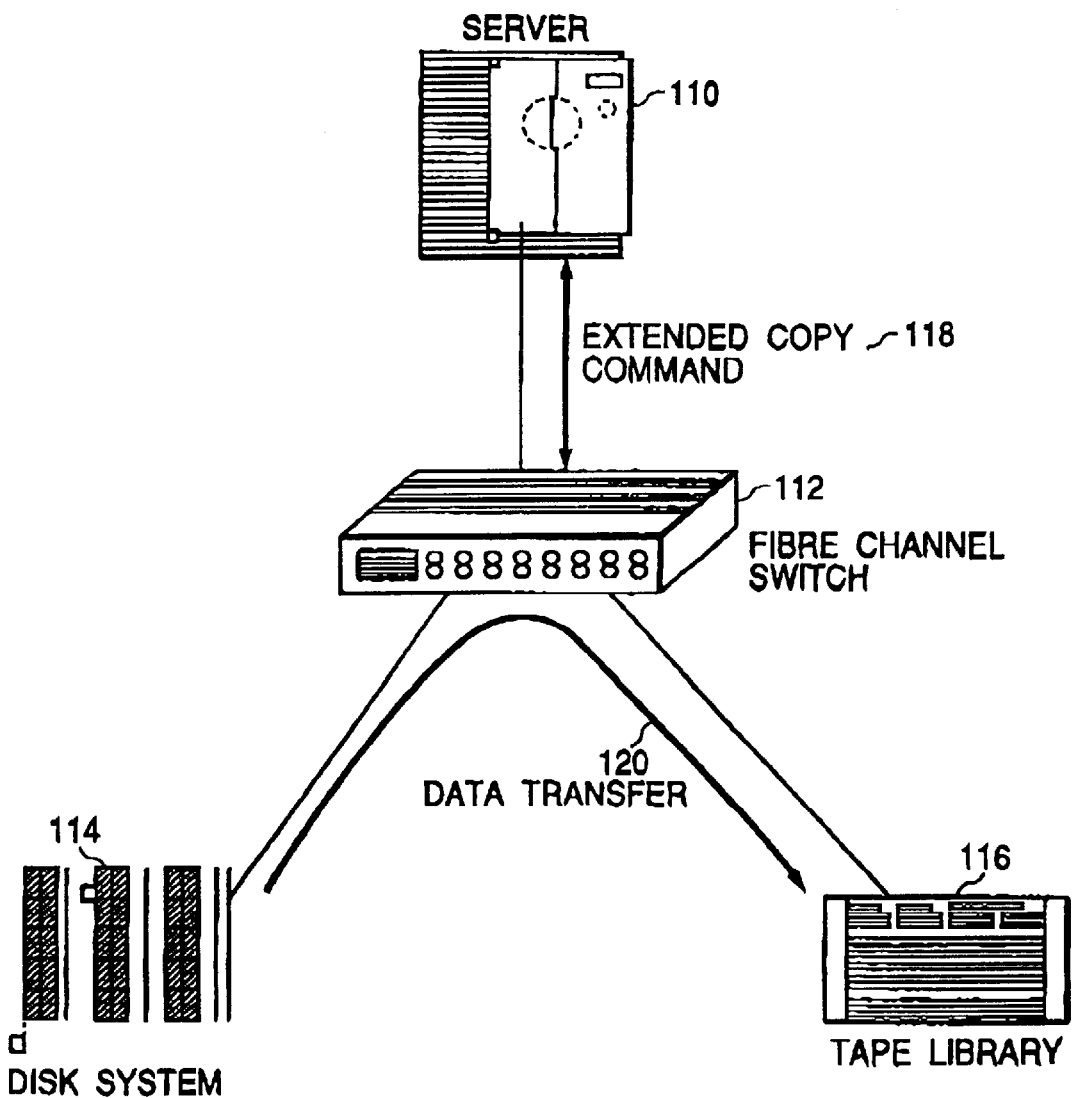
FIG. 1 shows a prior art system that uses a Fibre Channel Switch to perform the back-up after receiving a command from the host or server.
Figure 2:
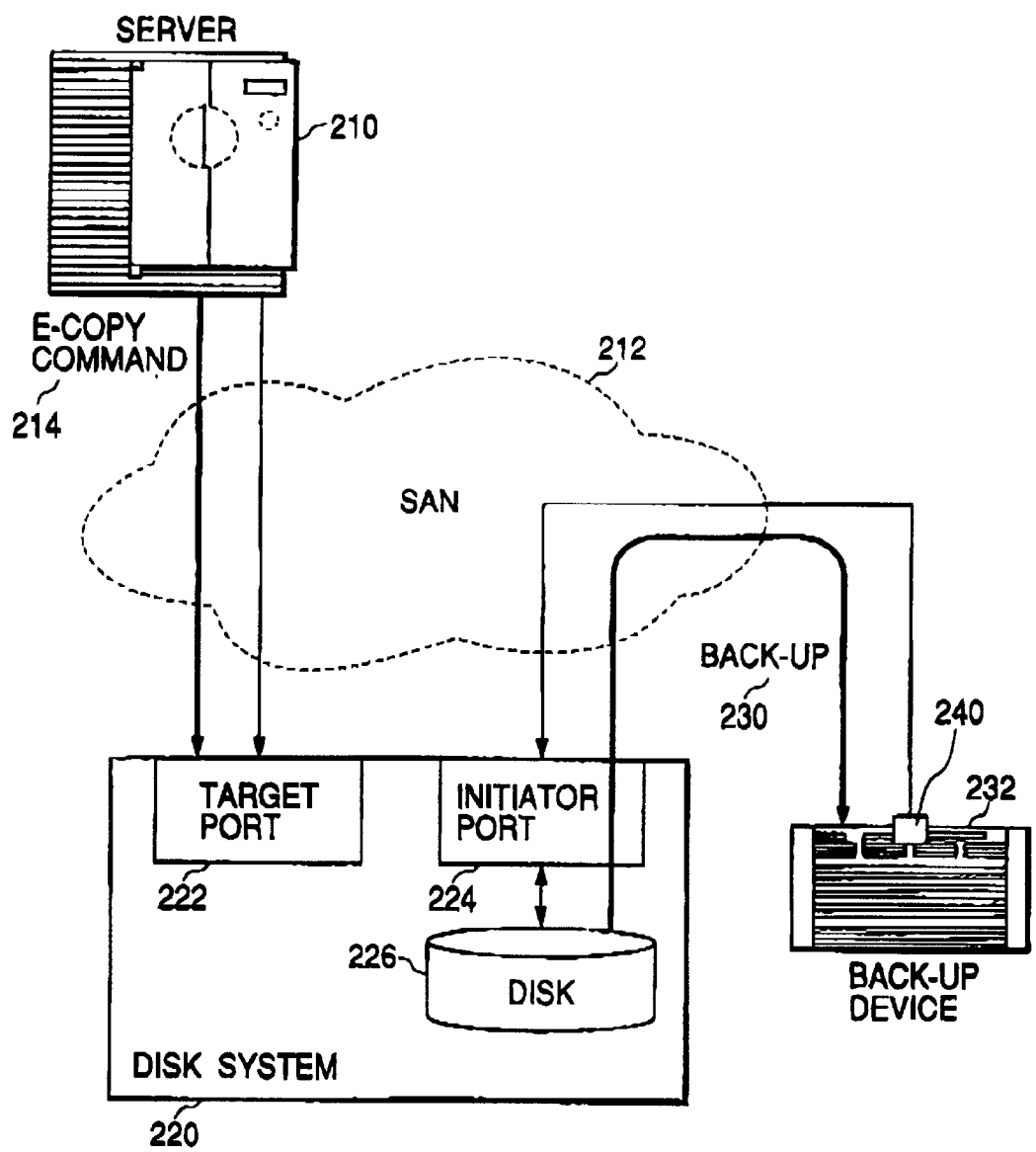
FIG. 2 shows a simplified back-up system architecture of one embodiment of the present invention.

FIG. 2 shows a simplified back-up system architecture of one embodiment of the present invention. A Server 210 is coupled to a Disk System 220 via a SAN 212. The Disk System 220 is coupled to a Port 240 on Backup Device 232, for example, a tape, a DLT, a DVD, a CD, a disk cache, another disk system, or other storage device, via the SAN 212. The Server 210 sends an E-copy command 214, using for example, a SCSI-FCP protocol, of a format like that shown in FIGS. 3 and 4, to a target port 222 of Disk System 220. The Disk System 220 processes the E-copy command and determines that initiator port 224 will be used for a server 210, where the parameter list specified that the Back-up Device Port 240 would be used for the backup of the data on disk 226. The data on disk 226 as specified by the E-copy command is copied (Backup 230) through initiator port 224 to Back-up Device Port 240, using a SCSI-FCP protocol, under control of the Disk System 220 and independent of server 210. Server 210 is informed after the Backup 230 is complete.

Figure 5:
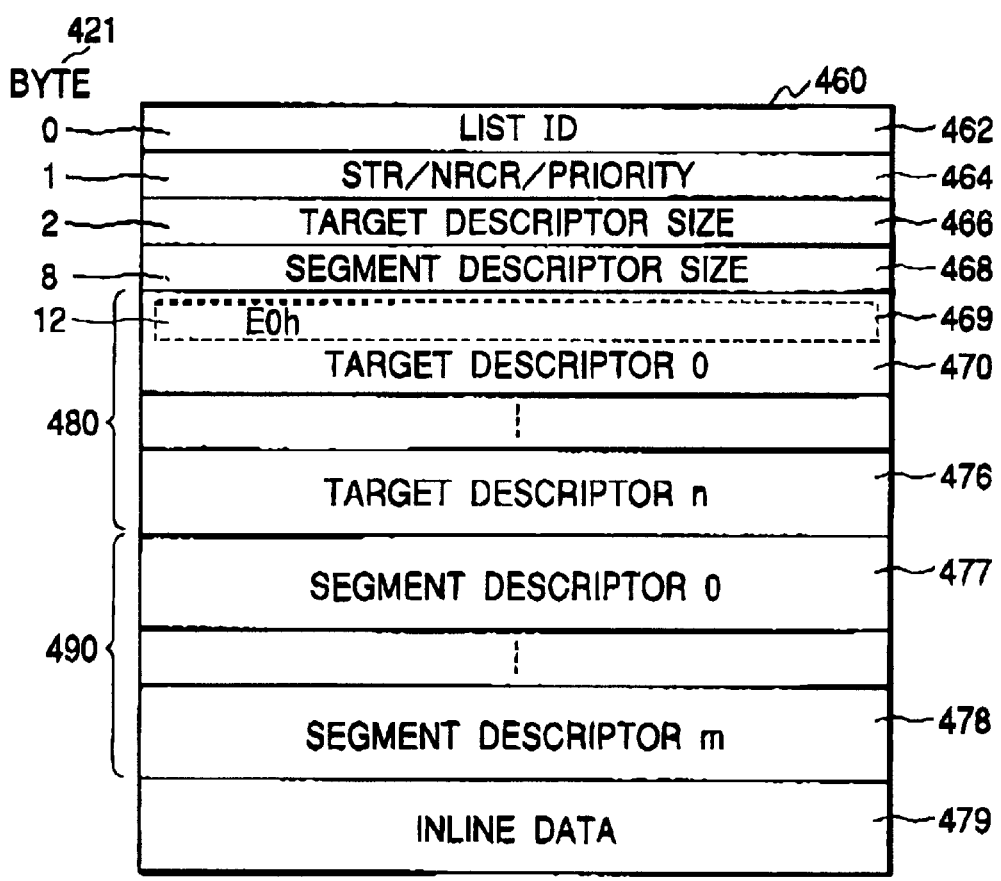
FIG. 5 shows another example of a parameter list of an embodiment of the present invention.

FIG. 3 shows an Extended Copy (E-Copy) command of one embodiment of the present invention. The E-Copy command 404 is SCSI-FCP command to copy information from a source logical unit(s) to a destination logical unit(s) according to a parameter list (FIGS. 4 and 5). The format of the E-Copy command 404 is given by "the Draft SCSI Primary Commands-2 (SPC-2)," T10/1236-D rev. 19, Mar. 2, 2001 (an internal working document of T10, a Technical Committee of Accredited Standards Committee NCITS (National Committee for Information Technology Standards) with T10 web site at www.t10.org and published by the American National Standards Institute, New York, N.Y.), and is herein incorporated by reference. The E-Copy command 404 is 16 bits wide and 16 bytes long. The parameter list length 412 gives the length in bytes of the parameter list in a Data-Out buffer. The actual copy directions are given in the E-Copy parameter list which follows the E-Copy command 404.

FIG. 4 shows one example of a parameter list of an embodiment of the present invention. The format of this example is of the SPC-2 (referred to herein as the SPC-2 parameter list 418). The parameter list is 16 bits wide. Two specific features of the SPC-2 parameter list 418 are in bytes 12–15, inline data length 429, with length of 4 bytes, and bytes 16–47, target descriptor 0 432. The target descriptor 0 432 is of fixed length (32 bytes) and has an initial byte 430 (byte 16) of "E0" hexadecimal (E0h). A target descriptor of 430 gives for example, the World Wide Name (WWN) uniquely identifying a SCSI device port and a Logical Unit Number (LUN) identifying the logical unit within the SCSI device. In an alternative embodiment a $N_{13}$ Port may be used to describe the target port. The target descriptors 430 are a list of where the data is copied from (source) to where the data is copied to (destination). The target descriptors 430 also specify the types of devices to be used, for example, a block device, e.g., disk system, sequential access device, e.g., tape or stream device, or a processor, e.g., stream device.

Each of the segment descriptors 450 uses the target descriptors 430 to specify a target descriptor source for the source of the data and a target descriptor destination for the destination of the data. For example, let Target Descriptor 0

432 give the WWN for target port 222 with a LUN "A" referring to data block on disk unit 226 and let Target Descriptor "N" 434 refer to Backup device Port 240 and a LUN "B" related to a disk block on the Backup device. Segment Descriptor 0 452, in this example, would include information on the source: Target Descriptor 0 432 and designation of the backup: Target Descriptor N 434. It is then either manually or automatically up to the disk system to determine the initiator port(s) to be used to copy the data from LUN A on disk 226 to LUN B through port 240 on the Back-up device 232. In one embodiment a port group is set manually, for example, in this case, the group includes target port 222 and initiator port 224. In an alternative embodiment the disk system could in series check every initiator port (other initiator ports for FIG. 2 are not shown), until an initiator port is found that connects to Backup device Port 240 and a back up of LUN A is performed.

FIG. 5 shows another example of a parameter list of an embodiment of the present invention. Unfortunately, unlike the E-Copy command 404, there are many vendor specific parameter list formats. The vendor specific format 460 of this example is of Legato ®. In comparing Legato ®'s parameter list to the SPC-2 parameter list 418: the list ID's 420 and 462, STR/NRCR/PRIORITY 422 and 466, target descriptor list length 424 and 464, and segment descriptor list length 428 and 468 are the same or similar in format. The $12^{th}$ byte 469 differs. In the SPC-2's parameter list 418 the $12^{th}$ byte is the inline data length 429, while in Legato's ® parameter list 460, there is no inline data size (or inline data), but the byte $12^{th}$ is the target descriptor 0 first byte 469, e.g., "E0h," (in contrast for SPC-2, the first byte, also "E0h," occurs at the $16^{th}$ byte 430 in FIG. 4). Since the Inline Data Length 429 is 4 bytes long, presetting it to "00h" should have only a small effect on the maximum amount of Inline Data 455 is allowed in FIG. 4. Thus if byte 12 is checked in both the SPC-2 and Legato ® formats, it is "00h" for SPC-2 and "E0h" for Legato ®, the system can distinguish between the two the parameter list formats. Therefore this embodiment can be used for both the Legato ® and SPC-2 formats.

Figure 6:
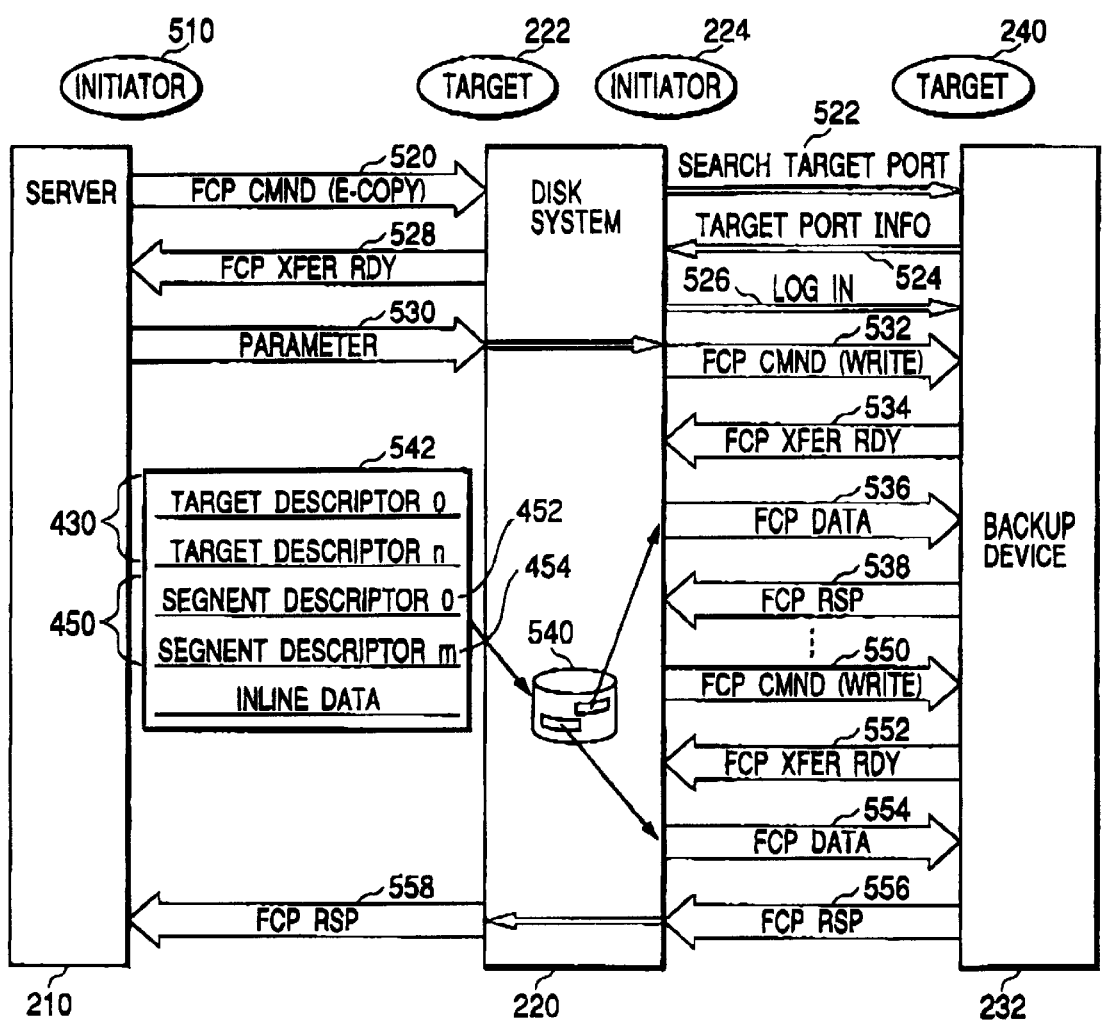
FIG. 6 shows a simplified copy control/data sequence for the E-copy command of one embodiment of the present invention.

FIG. 6 shows a simplified copy control/data sequence for the E-copy command of one embodiment of the present invention. The server 210 through its initiator port 510 sends a Fibre channel protocol (FCP) command or E-copy command 520 (e.g., FIG. 3) to the target port 222 of Disk System 220. Next, Disk system 220 acknowledges to server 210 that the FCP transfer (XFER) is ready (RDY) 528 to begin. The server 210 sends through its initiator port 510 the E-copy parameter list 530 (FIG. 4 or 5) to the target port 222 on Disk system 220. For example, Target Descriptor 0 parameter list 542 may have the WWN for Target Port 222 and a LUN for blocks of data in disk 540. Target Descriptor N may have the WWN for target port 240 on Backup device 232. Segment Descriptor 0 may, for example, indicate the copying of Target Descriptor 0 to Target Descriptor N. Thus Disk system 220 uses the segment descriptors 450 of the parameter list 542 to determine the source and destination target port(s) of the backup device(s), using for example, the WWN of the backup device target port and associated LUN. Disk system 220 then selects an initiator port 224 and searches if target port 240 is available on a backup device 232. If target port 240 on the backup device 232 is available, backup device 232 returns its target port information 524 to disk system 220 initiator port 224. Disk system 220 then logs in 526 to the Backup Device 232 through target port 240. Disk system 222 through its initiator port 224 sends an FCP Write Command (FCP CMND (WRITE)) 532 to the target port 240 of Backup device 232. Backup device 232 then responds with FCP XFER RDY 534 indicating it is ready to receive the transfer of data. Disk system 220 then takes the portion of the data specified by the parameter list 542 in the disk 540 and the sends the FCP data 536 to Backup device 232. Backup device 232, upon receiving the portion of data 536, sends a FCP Response (RSP) 538 which acknowledges the successful receipt of the data. Disk system 220 then sends another FCP CMND (WRITE) 550 to Backup device 232 indicating that it is ready to write another portion of data from disk 540 to target port 240. The backup device 232 sends back a FCP XFER RDY 552, when it is ready for the data transfer. Disk system 220 then sends another portion of data from disk system 540 as specified in parameter list 542 through its initiator port 224 as FCP DATA 554 to target port 240 of Backup device 232. Backup device 232 responds with a FCP RSP 556 indicating that the next portion of data has been received correctly. This process repeats until all the data specified in parameter list 542 is backed up. On the last transfer Disk system 220 sends an FCP RSP 558 to server 210 indicating that the E-copy command has been finished.

Figure 7:
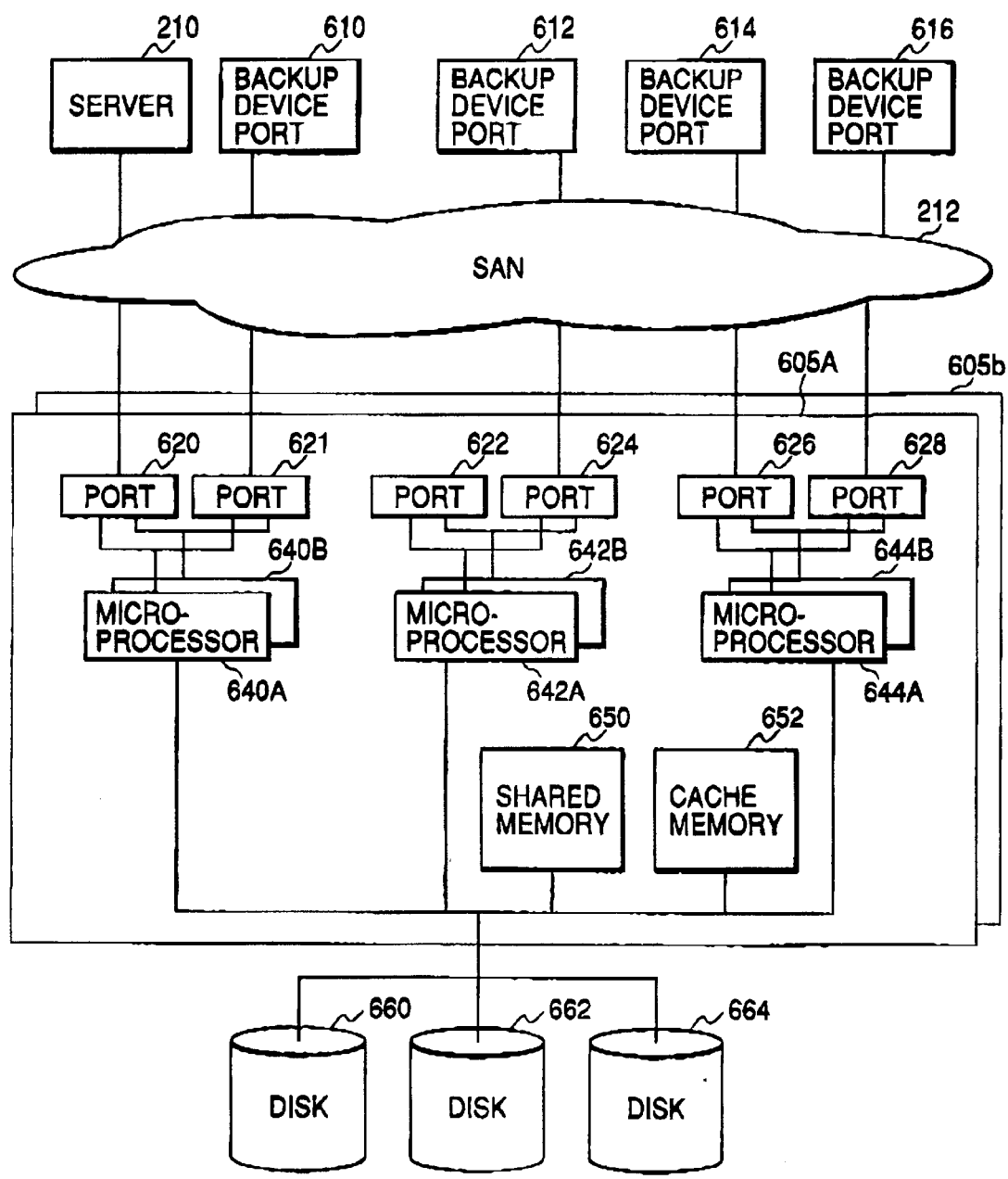
FIG. 7 illustrates a simplified system architecture of another embodiment of the present invention.

FIG. 7 illustrates a simplified system architecture of another embodiment of the present invention. FIG. 7 shows a server 210 connected via SAN 212 to target port 620 of a disk system 601. The disk system 601 includes the disk controller systems 605a and 605b which are connected through the SAN 212 to a plurality of the backup device ports, for example backup device ports 610, 612, 614, and 616. Since each backup device port has, for example, a unique WWN assigned to it, the backup port not the backup device is what the ports on the disk system controllers are trying to connect to. There are two disk controller systems: a disk controller system 605a and a redundant disk controller system 605b. Both disk controller systems 605a and 605b are connected to a plurality of disks including, for example, 660, 662, and 664. In addition all ports on disk controller 605A have duplicate ports on disk controller 605B. The disk controller systems 605A and 605B and the plurality of disks illustrate one example of a disk system such as Disk system 220 or disk system 114 or disk system 710 or a Redundant Array of Independent Disks (RAID) system.

In order to simplify the explanation, only the disk controller system 605A connected to the a plurality of disks including, for example, 660, 662, and 664, will be further explained. For purposes of illustration, the following disk controller system 605A backup device combinations are given: initiator port 622 is not connected to a backup device port; initiator port 624 is connected to backup device target port 610; initiator port 626 is connected to backup device target port 612; and initiator port 628 is connected also to backup device target port 610. All these connections are made through various paths through the storage area network (SAN) 212. Thus in other examples, various other connections are possible. For example, port 622 may be connected to backup device port 616, or port 621 may be connected to backup device port 614 and so forth. Target port 620 is connected to microprocessors ($\mu$P's) 640A and 640B. Initiator ports 622 and 624 are connected to microprocessor 642A and to microprocessor 642B. Initiator ports 626 and 628 are connected in parallel to the two microprocessors 644A and 644B. Thus in this embodiment, a pair of ports are connected to a pair of microprocessors. In one embodiment, more specifically (but not shown in FIG. 7), the pair of microprocessors are connected to a Fibre channel processor, which is then connected to the pair of ports. The microprocessors 640A, 640B, 642A, 642B, 644A, and 644B are connected to Shared Memory (SM) 650, a cache memory 652, and to a plurality of disk storage units (which include logical disk units), for example, disk 660, disk 662, and disk 664. The shared memory (SM) 650 is considered a critical section and only one microprocessor is allowed access at one time. For example, one microprocessor will seize control of the SM 650 and have exclusive access to the SM until the microprocessor releases the SM. The microprocessors 640A, 640B, 642A, 642B, 644A, and 644B run concurrently, and each one independently polls the SM 650 looking for certain bitmap information.

Figure 8:
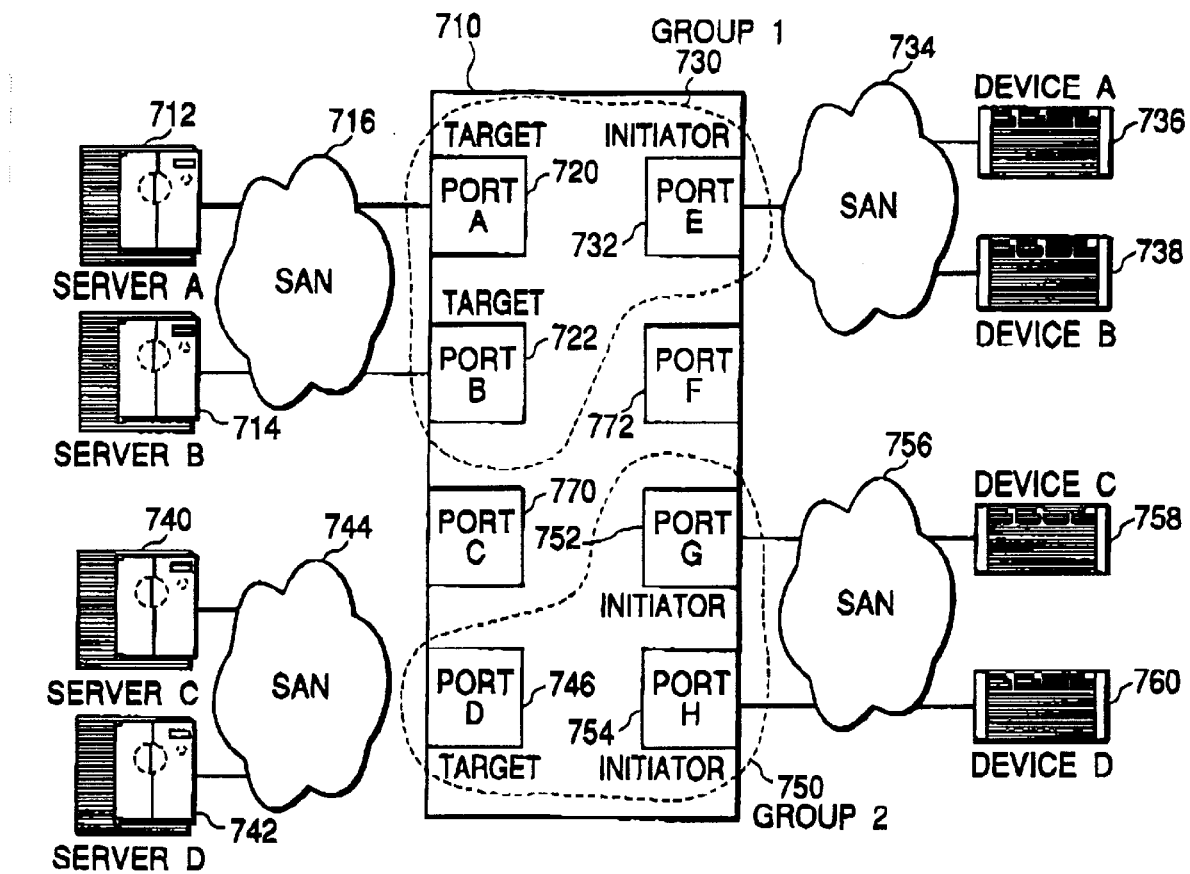
FIG. 8 shows an example of groups of target and initiator ports for a disk system of one embodiment of the present invention.

FIG. 8 shows an example of groups of target and initiator ports for a disk system of one embodiment of the present invention. In FIG. 8 there are a plurality of servers, for example, server A 712 server B 714, server C 740, and server D 742. The plurality of servers are connected to a disk system 710, which is also connected to a plurality of backup device ports, for example, backup device A 736, backup device B 738, backup device C 758, and backup device D 760, via one or more SAN's. For the purposes of illustration the individual back-up ports are not shown, although it should be understood that the connection is to the backup port not the device. Also SAN's 716, 744, 734, and 756 may all be one big SAN or the may be a combination of one or more storage area networks. The purpose of the disk system 710 in FIG. 8 is to receive E-copy commands from a plurality of servers and back up the appropriated disk information associated with those servers to the available backup devices. The purpose of the groups of ports or port groups, for example, Group 1 730 consisting of target port A 720, target port B 722 and initiator port E 732 and, for example, the group 2 750 consisting of target port D 746, and initiator port G 752, and initiator port H 754, is to use the users knowledge of the system in assigning target ports and initiator ports in order to improve the efficiency and security of locating the backup device ports. In an alternative embodiment the disk system 720 could search all the initiator ports to locate the appropriate backup device port, when a back-up from a target port is requested. In the example in FIG. 8, server A 712 is connected via SAN 716 to target port A 720 and server B 714 is connected via SAN 716 to target port B 722 (or in the alternative, the connections can be switched). The initiator Port 732 of the disk system 710 locates through SAN 734, for example, a port on device A 736 as the target backup device port. In the example of Group 2 750, either server C 740 or server D 742 can connect via SAN 744 to target port D 746. Then initiator port G 752 or initiator port H 754 may be used for backup. Initiator port G 752 may be connected to device D 760 through SAN 756 and initiator port H 754 may be connected to a port on device C 758 and also to the above target port on device D 760. The numbers and configurations of the servers and backup devices and the number and combinations of target ports and initiator ports and groups in disk system 710 are for illustration purposes only and are not meant as a limitation on the scope of the invention.

The port groups are selected manually either by use of display screens similar to FIGS. 12 and 13 to be discussed later or via a graphical map such as shown in FIG. 8. Disk system 710 may be connected to a user management console. The disk system 710 may have auto-discovery software like that used by network managers (for example HP Openview from Hewlett-Packard Company of Palo Alto Calif.) using for example, SNMP or CMP. A connection graph can show which disk system ports are connected to which servers and which back up devices. Either using a mouse or the keyboard, groups can be selected, modified and displayed on a screen. Highlighting may also occur when the groups are in use. In addition the connection graph may be used to set the parameter list.

Figure 9:
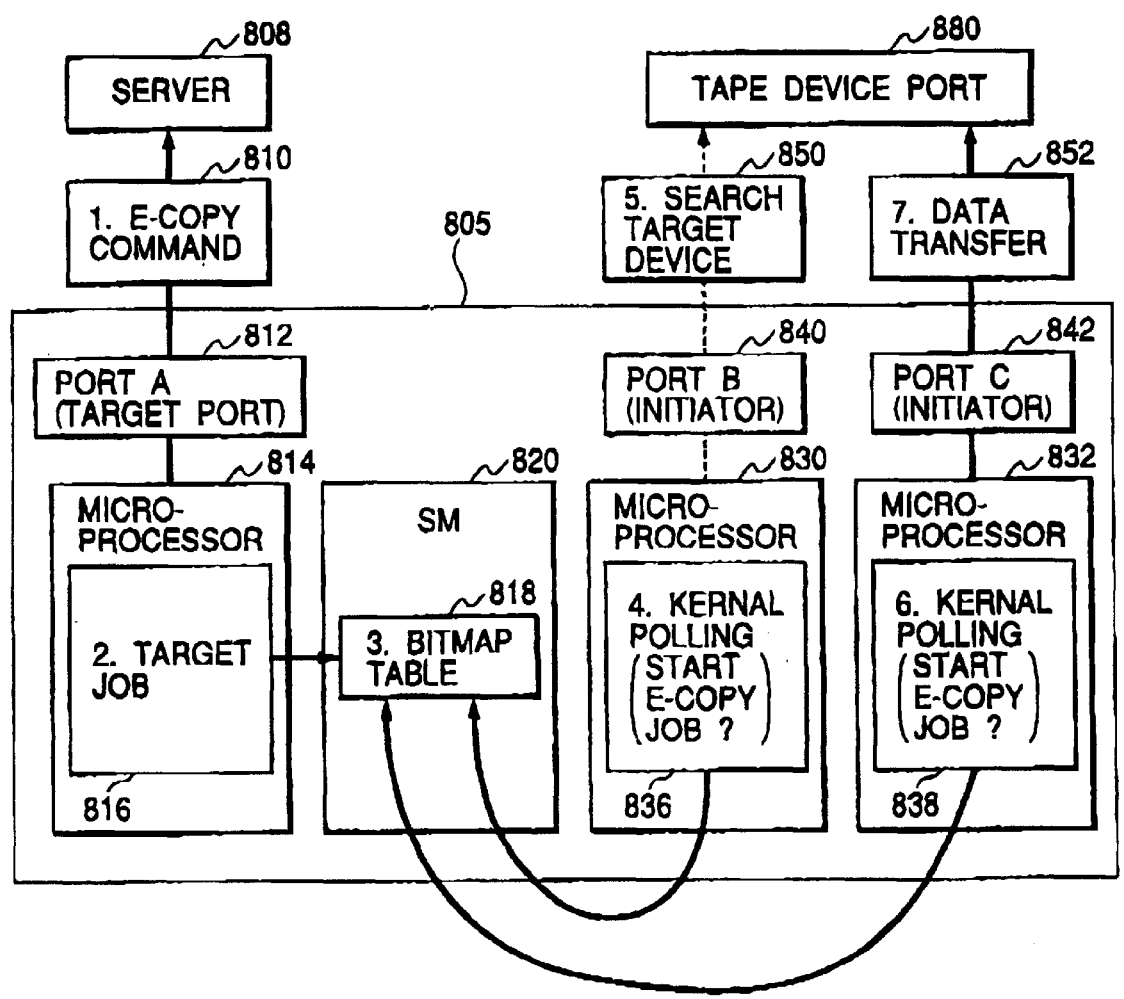
FIG. 9 illustrates a simplified example of a backup procedure for an embodiment of the present intention.

FIG. 9 illustrates a simplified example of a backup procedure for an embodiment of the present intention. The server 808 sends an E-Copy command 810 to port A (target port) 812 of Disk system 805. The E-copy command starts the execution of target JOB 816 on microprocessor 814. Target JOB 816, using the parameter list of the E-copy command, then places in shared memory (SM) 820 a bitmap table 818 indicating which microprocessors may be used to execute the E-copy command, i.e., the backup of server 808 data stored on a logical unit on a disk (not shown) to a tape device port 880. For illustration purposes assume both microprocessors 830 and 832 are in the bitmap table 818. Microprocessors 830 with initiator port B 840 and microprocessor 832 with initiator port C 842 run concurrently with microprocessor 814. Both microprocessors 840 and 842 kernels concurrently poll the SM 820 to determine if they can start the E-Copy job (836 and 838). In this example let microprocessor 830 access the bitmap 818 first, seize exclusive control of the SM 820, and assume it determines it may start the E-copy job. The microprocessor 830 through the port B 840 then searches 850 for tape device port 880. In this example of the search 850, microprocessor 830 (via initiator port B 840) cannot connect to tape device port 880. The reasons for the non-connection may include, tape device port 880 is not available or there is no available SAN connection or tape port 880 is busy. Next, the microprocessor 830 releases its control of SM 820. Assume next that microprocessor 832 takes exclusive control of SM 820 and by examining the bitmap table 818 determines it may start an E-copy job 838. The microprocessor 832 through initiator port C 842 again searches for tape device port 880 and finds it available. The microprocessor 832 then executes the data transfer 852 from the logical unit in the disk system 805 through initiator port C 842 to tape device port 880. Upon completion of the backup, microprocessor 832 notifies the Target job 816 on microprocessor 814 that it has successfully completed the backup, and microprocessor 814 then notifies the server 808 via target port A 812, that the backup is complete. If microprocessor 843 also cannot connect to tape device port 880, then an error message is sent back to the server 808 via microprocessor 814.

Figure 10:
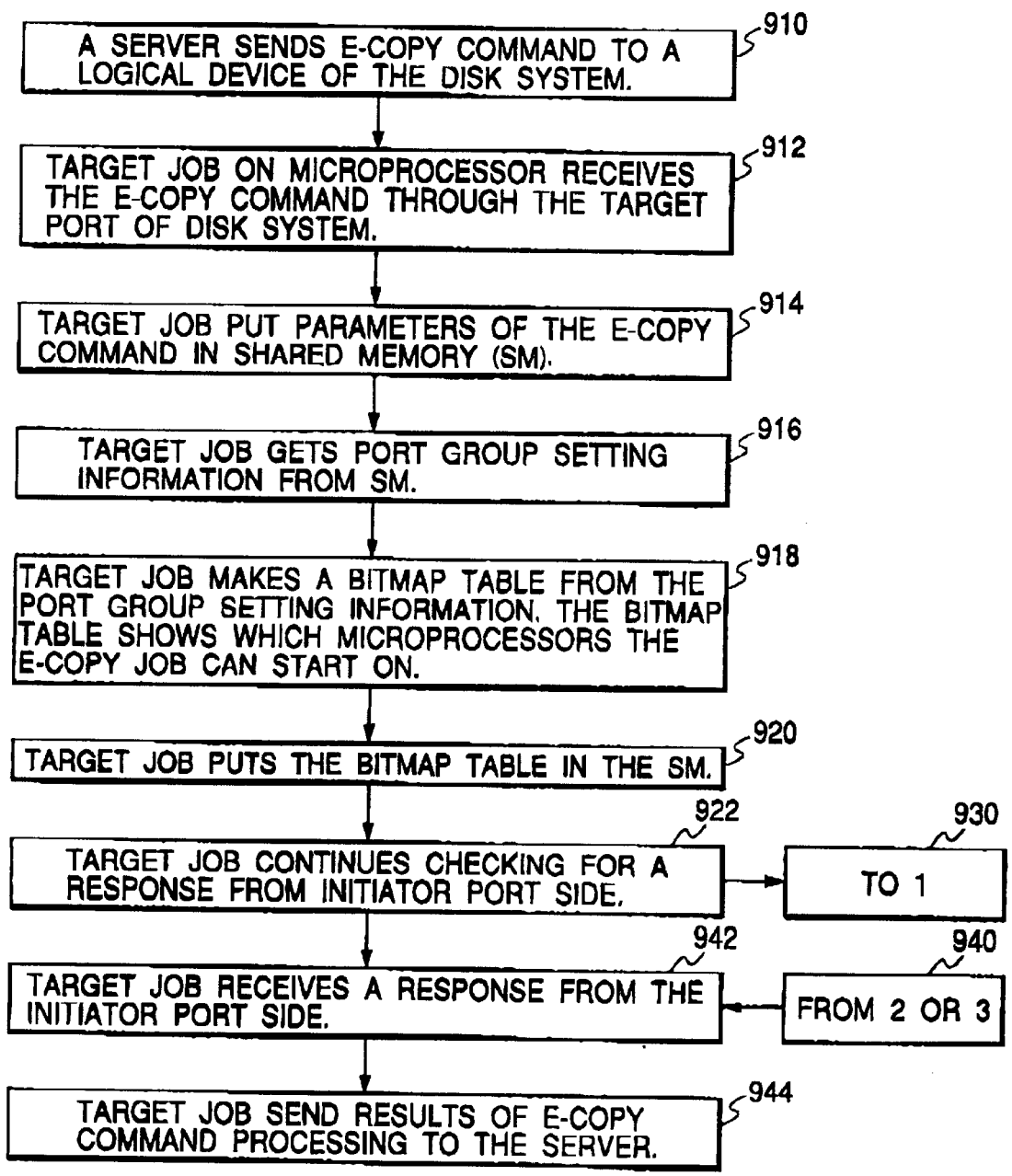
FIG. 10 gives a flowchart for the target port process side of an E-Copy command of an embodiment of the present invention.

FIG. 10 gives a flowchart for the target port process side of an E-Copy command of an embodiment of the present invention. The disk system of FIG. 7 is used for illustration purposes. At step 910 a server 210 sends an E-Copy command to a target port 620, for a logical device, for example, a logical volume on disk 660. At step 912a target job on the microprocessor 640A, receives the E-copy command through the target port 620 of disk controller system 605A. Note for simplicity of explanation, redundant disk controller system 605B is not explained. At step 914 the target job puts the parameter list, e.g., FIG. 4 or 5, of the E-copy command in the shared memory. The target job then gets the port group setting(s), for example, like that shown in FIG. 8, from the shared memory (step 916). At step 918 the target job makes a bitmap table from the port group setting information; the bitmap table shows which microprocessors the E-copy job can start on. At step 920 the target job puts the bitmap table in the shared memory. At step 922 the target job located on, e.g., microprocessor 640, waits for a response from the initiator port side (FIG. 10). Concurrently, at step 930 (to continuation 1) all kernels on the microprocessors on the initiator side have been polling the shared memory to check if the target job has put the bitmap table in the shared memory (step 1010, FIG. 11). When the initiator port side is finished processing the backup, at step 942, the target job receives the response from the initiator port side (from continuation 2 or 3). And at step 944 the target job sends the results of the E-copy command processing by the disk system 601 to the server 210.

Figure 11:
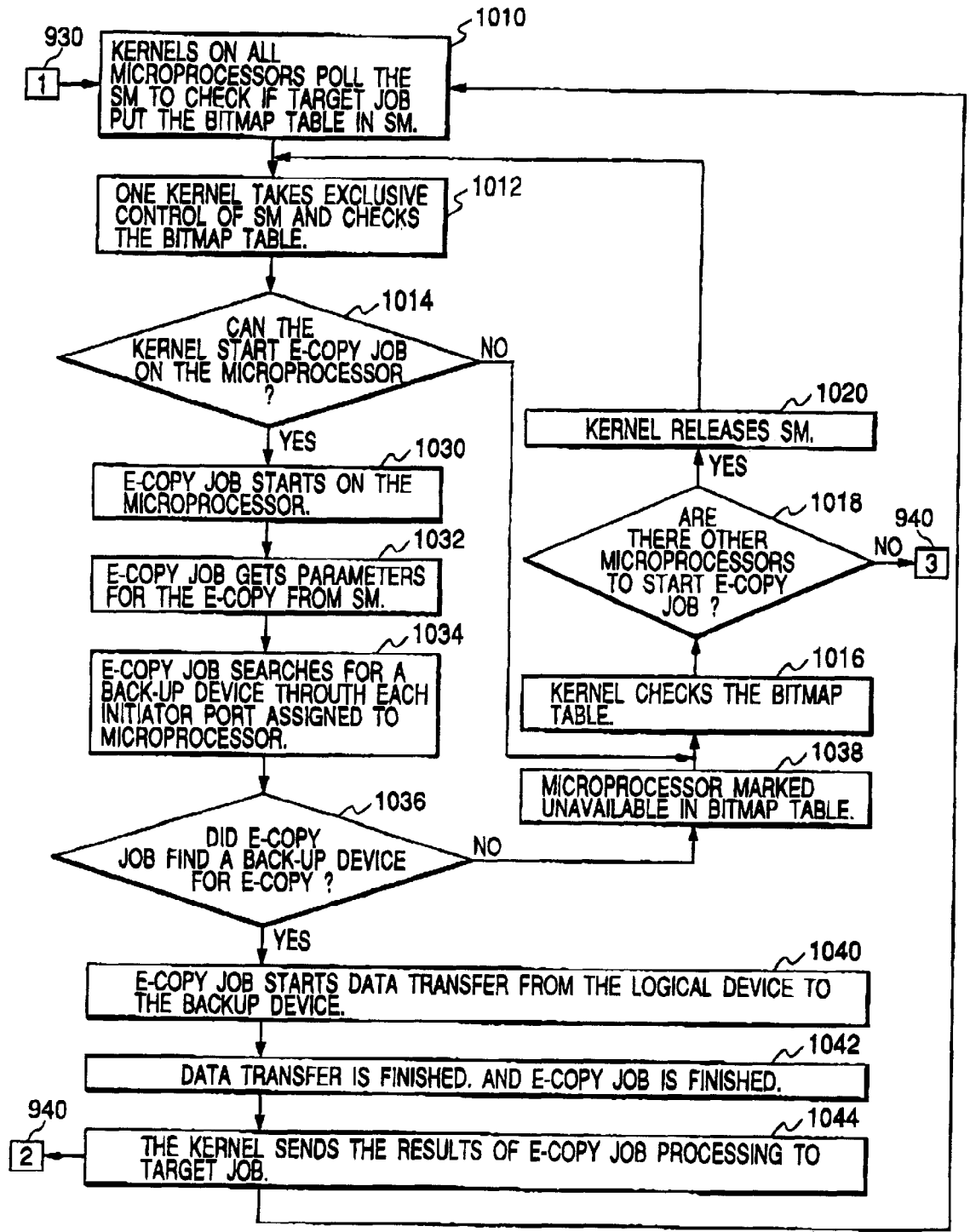
FIG. 11 shows a flowchart for the processing on the initiator port side of a disk system of an the embodiment of the present invention.

FIG. 11 shows a flowchart for the processing on the initiator port side of a disk system of an the embodiment of the present invention. From step 930 in FIG. 10 (from continuation 1), at step 1010, the initiator port microprocessors concurrently poll the shared memory to check if the target job has put the bitmap table in Shared Memory (SM), e.g., 650. At step 1012 one microprocessor that is polling the SM discovers there is a the bitmap table placed in SM by the target JOB, and that μP takes exclusive control of the SM and checks the bitmap table. At step 1014 the kernel tests if it can start the E-copy job on its microprocessor. If the kernel cannot start the E-copy job, for example, the microprocessor is not in the bitmap table, then the kernel checks the bitmap table again at step 1016. At step 1018, if there are other microprocessors that may be able to start the E-copy job, i.e., there are other unchecked microprocessors in the bitmap table, then the present kernel releases the shared memory at step 1020 and another polling kernel takes exclusive control of the shared memory at step 1012 and the process repeats. At step 1030, if the kernel can start the E-copy job on its microprocessor, the E-copy job starts. At step 1032 the E-copy job gets the parameter list for the E-copy command, for example, table 418 in FIG. 4, from the shared memory. At step 1034 the E-copy job searches for the backup device target port given in the parameter list for each initiator port assigned to the microprocessor. For example, microprocessor 642A is connected to both port 622 and port 624. Hence μP 642A searches, for example, for the back-up device port, for example Backup Device Port 610, on initiator port 622 first. Then finding no available back-up port, μP 642A next searches for the back-up device port given in the parameter list, on initiator port 624. At step 1036 the kernel tests if the E-copy job found the available backup device port for the E-copy. If a backup device port was not found or not available, then at step 1038, the microprocessor is marked unavailable in the bitmap table and at step 1018 the kernel checks the bitmap table again to see if there are other microprocessors to start the E-copy job. If there are none, then at 940 (to continuation 3), the process returns to step 942 in FIG. 10. If the initiator port can find the backup device port for the E-copy JOB, then at step 1040 the E-copy job starts the data transfer from the logical device to the backup device. When the data transfer is finished, the E-copy job is finished (step 1042). The bitmap is removed from the SM. The kernel sends the results of the E-copy job processing to the target job at step 1044 and proceeds to 940 (continuation 2) in FIG. 10; and also the kernel proceeds to step 1010 and waits for the next bitmap table to be placed in the shared memory by another target JOB.

For illustration purposes only, the following is a description of how FIGS. 7, 8, 10 and 11 work together. First, a user creates a path group using a graphical user interface (GUI) similar to FIG. 8 (or the user can use FIG. 13 to create port groups). The port group is stored in SM 650. Assume the port group has target port 620, initiator ports 622, 624, and 628 of FIG. 7. Let server 210 send an E-copy command to disk controller system 605A to back-up the information on a logical unit A on disk 664 to a tape library, for example, back-up device port 610 (step 910 of FIG. 10). This source/destination information is in the E-Copy parameter list. Microprocessor (μP) 640A gets the E-copy command via target port 620. The μP 640A retrieves the path group information from SM 650 and creates for example the following table 1 (which is the bitmap table for this example):

TABLE 1

| Item | μP | Port | Availability bit |
|---|---|---|---|
| 1. | 642A | 622 | Y |
| 2. | 642A | 624 | Y |
| 3. | 644A | 628 | Y |

This table 1 is then stored in SM 650 (step 920). At step 1010 assume μP 640B while checking table 1, after it has been placed in SM 650, is the first μP to seize exclusive control of the SM (step 1012). All other μP's are locked out from SM until μP 640B releases control of the SM. μP 640B checks table 1 and as it is not in the bitmap table, it cannot start the E-copy job, so steps 1014 and 1016 are then performed. As there are still μP's left, indicated by the "Y" in the availability column of table 1 for items 1 to 3, the μP 640B kernel releases the SM (step 1020).

Let μP 642A be the next processor that seizes control of the SM. As each microprocessor is concurrently polling the SM for access, the order for testing the SM for access may not necessarily be in any fixed sequence, but more in a random or pseudo-random manner. μP 642A takes exclusive control of the SM, and can start the E-copy job. The E-copy job then is started (step 1030) and the parameter list, such as FIG. 4, is retrieved from SM by μP 642A. Assume segment descriptor 0 has a source the logical unit A on disk 664 that will be copied to designation tape library port 610. Let μP 642A select using port 622, then port 622 in this illustration) to search for back-up tape device port 610 (step 1034). As initiator port 622 is not connected to any back-up device it fails, and, the initiator port 624 is then selected. Suppose port 624 cannot connect to back-up device port 610, for example, tape device port 610 is busy. The result for step 1036 is that the E-copy cannot find the back-up device port 610 for the E-copy command, and at step 1038, μP 642A is marked unavailable ("N") in the table, i.e., the availability bit for items 1 and 2 are turned off. Table 2 shows the result:

TABLE 2

| Item | μP | Port | Availability bit |
|---|---|---|---|
| 1. | 642A | 622 | N |
| 2. | 642A | 624 | N |
| 3. | 644A | 628 | Y |

At step 1018 there is still μP 644A to check and μP 642A releases the kernel (step 1020). Assume μP 644A takes control of SM and can start the E-copy job. Then at step 1034 through port 628, assume μP 644A can connect to back-up device port 610. At step 1040 μP 644A backs-up the data on disk 662 to back-up device port 610. When the back-up process is finished, initiator μP 644A informs the target μP 640A (step 1044) that the back-up is finished. The bitmap table 2 is deleted from the SM. The target μP 640A then informs the server 210 of the completion of the job (step 944).

Figure 12:
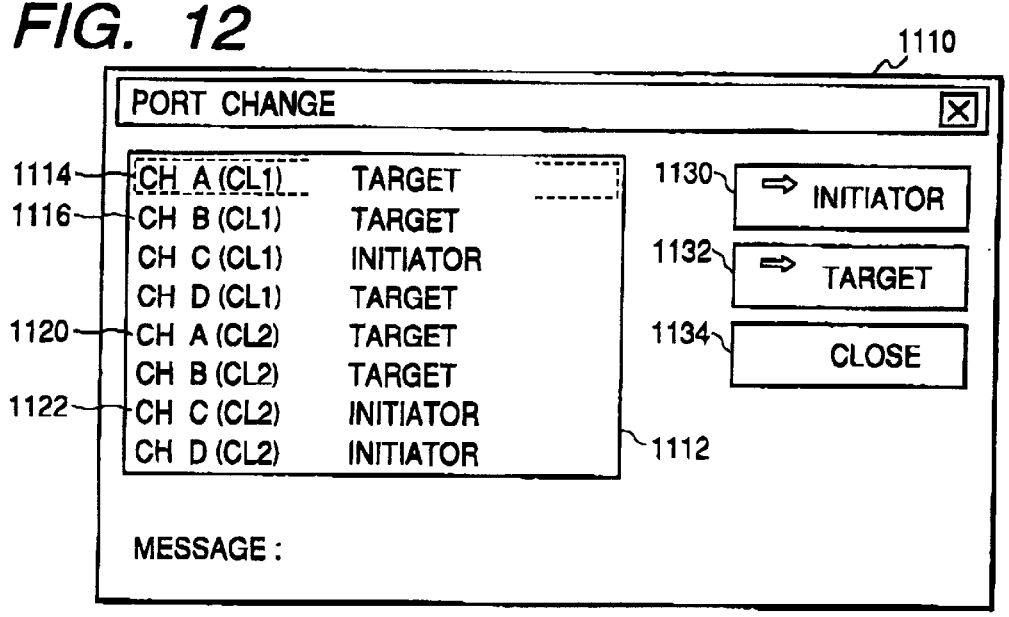
FIG. 12 shows a GUI for changing target/initiator port designations on a disk system of an embodiment of the present invention.

FIG. 12 shows a GUI for changing target/initiator port designations on a disk system of an embodiment of the present invention. The display screen 1110 shows a list of ports with associated target or initiator port designations 1112, for example CH A(CL1) Target 1114, CH B(CL1)

Target 1116, CH A(CL2) Target 1120, and CH C(CL1) Initiator 1122. The terms CL1 and CL2 refer to the redundant disk controller systems, 605A and 605B, respectively. Since the disk controller systems have redundant ports, the terms CL1 and CL2 are used to distinguish between the disk controller system ports. A port is specified on the screen 1112 and changed to an initiator port by clicking on the initiator button 1130 or changed to a target port by clicking on the target button 1132. For example CH A(CL2) Target port 1120 can be changed to CH A(CL2) Initiator port by highlighting CH A(CL2) Target 1120 on area 1112 and then clicking on the initiator 1130 button. The results of the port designations may be shown on a display with images similar to FIG. 8 or on a display showing only an image of the disk device 710 with associated ports.

Figure 13:
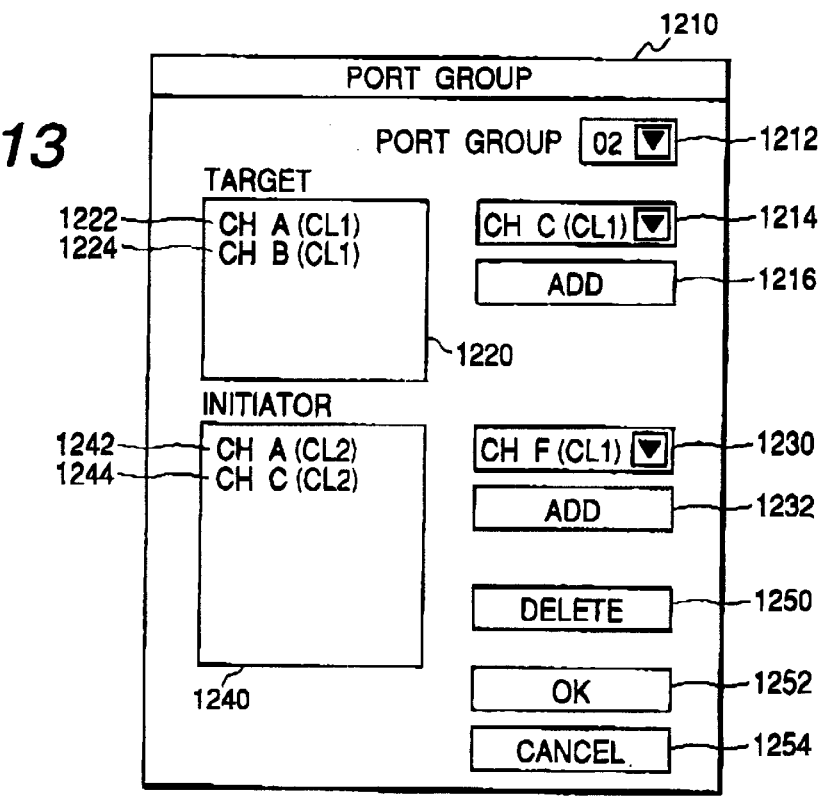
FIG. 13 shows a port group screen of an embodiment of the present invention.

FIG. 13 shows a port group screen of an embodiment of the present invention. FIG. 13 shows a port group screen 1210 displaying the target and initiator ports in port group 02, as shown port group field 1212. Target sub-screen 1220 lists the target ports in the port group 02, for example, CH A(CL1) 1222 and CH B(CL1) 1224. Field 1214 gives a target port to add 1216. Initiator sub-screen 1240 lists the initiator ports in the port group 02, for example, CH A(CL2) 1242 and CH C(CL2) 1244. Field 1230 gives an initiator port to add 1232. A port may be deleted from either the target sub-screen 1220 or the initiator sub-screen 1240 by highlighting the port and clicking the delete button 1250. The port grouping may be displayed on an image shown by disk system 710, for example, similar to Group 1 730 or Group 2 750.

In an alternative embodiment a computer program product stored in a computer readable medium for copying information from a storage system to a backup system of a plurality of backup systems is provided. The storage system is coupled with the plurality of backup systems via a storage area network. The computer program product includes: code for the storage system receiving a command to copy the information, where the command to copy is sent by said server; code for the storage system finding an available backup system; and under control of the storage system (not the server or network device), and code for transferring the information to the available backup system.

Although the above functionality has generally been described in terms of specific hardware and software, it would be recognized that the invention has a much broader range of applicability. For example, the software functionality can be further combined or even separated. Similarly, the hardware functionality can be further combined, or even separated. The software functionality can be implemented in terms of hardware or a combination of hardware and software. Similarly, the hardware functionality can be implemented in software or a combination of hardware and software. Any number of different combinations can occur depending upon the application.

Many modifications and variations of the present invention are possible in light of the above teachings. Therefore, it is to be understood that within the scope of the appended claims, the invention may be practiced otherwise than as specifically described.

What is claimed is:

1. A method for copying data from a storage system to a backup system of a plurality of backup systems, said storage system coupled with said plurality of backup systems via a network, said method comprising:

receiving a command by a first processor of the storage system to copy data from the storage system to the backup system, wherein said command to copy includes information of a destination device target port of the backup system;

based on said command to copy, determining an initiator port from a plurality of initiator ports of the storage system from which to send said data; and transferring said data from the storage system by a second processor of the storage system through said initiator port to the backup system through said destination device target port.

2. The method of claim 1 wherein determining an initiator port comprises automatically checking initiator ports of the storage system until an initiator port connecting to said destination device target port is found by the storage system.

3. The method of claim 1 wherein said command to copy is an extended copy command (E-Copy).

4. The method of claim 1 wherein a target port of said storage system receives said command to copy.

5. The method of claim 1 wherein determining an initiator port comprises manually setting an initiator port for said destination device target port.

6. The method of claim 5 wherein manually setting an initiator port for said destination device target port comprises grouping at least one initiator port of the storage system with at least one target port of the storage system which is configured to receive the command to copy.

7. The method of claim 1 further comprising determining whether said destination device target port is available, wherein said data is transferred to the backup system if said destination device target port is available.

8. The method of claim 1 wherein said network is a storage area network.

9. The method of claim 1 wherein said plurality of backup systems are tape drives.

10. The method of claim 1 wherein said storage system is a Redundant Array of Independent Disks (RAID) device.

11. A system for server free back up of information on a network comprising:

a storage system;

a plurality of backup systems; and a server system configured to send a command to backup data from the storage system to one of the plurality of backup systems;

wherein said command to backup includes information of a destination device target port of the backup system to receive the data, and wherein said storage system is configured to receive said command to backup by a first processor of the storage system, and to determine an initiator port from a plurality of initiator ports of the storage system from which to send said data by a second processor of the storage system, based on said command to backup.

12. The system of claim 11 wherein upon determining said initiator port, said second processor of said storage system backs up said data to said back-up system through said initiator port and said destination device target port independent of said server system.

13. The system of claim 11 wherein said back-up system is selected from the group consisting of a tape library, Hard Disk Drive, Zip Drive, DVD storage, and CD storage.

14. The system of claim 11 wherein said command to backup comprises an Extended Copy Command, having a parameter list, and is sent to a target port of said storage system.

15. The system of claim 11 wherein said storage system comprises:

at least one disk storage unit, comprising said data; and a disk controller system comprising a plurality of ports and coupled to said disk storage unit, wherein said plurality of ports comprise a first target port for receiving said command to backup from said server system and wherein said disk controller system is configured to automatically check initiator ports of the storage system until an initiator port connecting to said destination device target port is found.

16. A storage system for copying data from a storage unit to a backup system port of a plurality of backup system ports, said storage system coupled with said plurality of backup system ports via a network, said storage system comprising:

a plurality of initiator ports;

means for receiving a command to backup data from the storage unit, wherein said command comprises information of a destination device target port of a backup system to receive the data;

means for determining an initiator port, from a plurality of initiator ports based on the command to backup data, from which to send said data; and means for transferring said data to said destination device target port through said initiator port, said means for transferring said data being different from said means for receiving said command to backup.

17. A storage system for executing a command to backup data to one of a plurality of back-up devices over a network, comprising:

a disk configured to store data;

a first processor and a second processor;

a target port configured to receive said command by said first processor, including a parameter list, wherein said parameter list comprises information of a back-up device port of a backup device of said plurality of back-up devices; and an initiator port, from a plurality of initiator ports, responsive to said command for connecting to said back-up device port on said network by said second processor to backup said data to said backup device.

18. The storage system of claim 17 wherein said network comprises a storage area network.

19. The storage system of claim 18 wherein said storage area network comprises at least one of Fibre Channels, an Ethernet network, a TCP/IP network, and a Virtual Private Network (VPN).

20. The storage system of claim 17 further comprising a disk controller configured to determine said initiator port based on information contained in said command.

21. The storage system of claim 17 wherein said command is an E-Copy command.

22. The storage system of claim 17 wherein said parameter list includes a byte used to distinguish one vendor's parameter list format from another vendor's parameter list format.

23. A RAID system for executing a backup command from a server system, comprising:

a plurality of disk units for non-volatile storage of data; and at least one disk controller system coupled to said plurality of disk units and configured to receive and execute said backup command from said server, said disk controller system comprising:

a target port coupled to a first processor to receive said backup command from said server, said backup command including information of a target port of a backup device;

an initiator port coupled to a second processor, said initiator port being determined from a plurality of initiator ports based on information contained in said backup command for connecting to said target port of said backup device; and a shared memory coupled to said first and second microprocessors for exchanging information; and wherein when said disk controller system executes said backup command using said second processor without intervention from said server system.

24. The RAID system of claim 23 wherein said first processor runs concurrently with said second processor.

25. A method for a storage system of backing up said storage system's data according to a copy instruction, said method comprising;

receiving said copy instruction by a target processor;

responsive to said copy instruction including information of a destination device target port of a backup device, creating a bitmap table stored in memory, said bitmap table listing processors allowed to execute said copy instruction;

concurrently polling said memory by a plurality of concurrently running processors different from said target processor;

when a processor of said plurality of concurrently running processors is in said bitmap table, determining an initiator port from a plurality of initiator ports of the storage system based on said information of said destination device target port and connecting said processor through said initiator port to said destination device target port of said backup device via a network;

when said connecting is successful, backing up said storage system's data to said backup device.

26. The method of claim 25 wherein said data is contained in one of a plurality of non-volatile data storage elements of the storage system.

27. The method of claim 25 further comprising:

when said connecting is unsuccessful, trying to connect another processor in said bitmap table to said destination device target port of said backup device; and when said connecting is unsuccessful and there are no more processors in said bitmap table, generating an error message.

28. The method of claim 25 wherein said bitmap is created based on a port group which includes at least one initiator port of the storage system and at least one target port of the storage system configured to receive the copy instruction.

29. A system for backing up data located on a storage system to a backup device port of a backup system, according to a command sent to said storage system, said system comprising:

a target job on a target microprocessor receiving said command via said target microprocessor's target port, and responsive to said command puts a parameter list for said command including information of the backup device port in a shared memory;

a bitmap table created by said target job using a port group setting retrieved from said shared memory, wherein said bitmap table lists a plurality of initiator microprocessors that may start the target job;

an initiator microprocessor of a plurality of initiator microprocessors for taking exclusive control of said shared memory, when said bitmap table is put in said shared memory, said initiator microprocessors being different from said target microprocessor;

an initiator port associated with said initiator microprocessor for trying to connect to said backup device port;

wherein when said initiator port cannot connect to said backup device port, then removing said initiator microprocessor from the bitmap table; and wherein when said initiator port has failed to make a connection to said backup device, another initiator port associated with another initiator microprocessor of said plurality of initiator microprocessors tries to connect to said backup device port.

30. The system of claim 29 wherein if said initiator port connects to said backup device port, then copying said data located on said storage system to said backup system according to said parameter list.

31. A user interface for setting and modifying target and initiator ports in a port group of a disk system, said port group comprising at least one target port and at least one initiator port of said disk system, comprising:

a field for selecting said port group, wherein only said target ports in said port group are initially displayed in a target screen and said initiator ports in said port group are initially displayed in an initiator screen;

a field for adding a port to as a target port to said port group, said target port being associated with a target processor coupled to a shared memory; and a field for adding a port to as an initiator port to said port group, said initiator port being associated with an initiator processor coupled to said shared memory; and wherein only ports within said port group communicate with each other via said shared memory coupled to target ports and initiator ports.

32. A graphical user interface (GUI) for determining a port group from a plurality of ports in a disk system, said GUI comprising:

items on a display representing target ports and initiator ports of a disk system;

a connection graph showing in graphical format the connections between servers, storage systems and back-up devices; and a user input device for selecting a target port of said disk system and an initiator port from a plurality of initiator ports of said disk system that are part of said port group, said target port associated with a target processor coupled to a shared memory, said initiator port associated with an initiator processor coupled to said shared memory to share information with said target processor.

33. A computer program product stored in a computer readable medium for copying data from a storage system to a backup system of a plurality of backup systems, said storage system coupled with said plurality of backup systems via a network, said computer program product comprising:

code for receiving a command to copy data from the storage system to the backup system by a first processor of the storage system, wherein said command to copy includes information of a destination device target port of the backup system;

code for determining an initiator port from a plurality of initiator ports of the storage system from which to send said data, based on said command to copy; and code for transferring said data from the storage system by a second processor of the storage system through said initiator port to the backup system through said destination device target port.

* * * * *